United States Patent [19]
Washio et al.

[11] 3,958,880
[45] May 25, 1976

[54] COPYING MACHINE OF THE DIAZO TYPE

[75] Inventors: Takaji Washio, Toyonaka; Tadanobu Nakajima, Kashiwara; Hideo Miyoshi, Habikino; Masahiro Yoshioka, Osaka; Tatsuo Aizawa, Osaka, all of Japan

[73] Assignee: Mita Industrial Company, Ltd., Osaka, Japan

[22] Filed: Dec. 5, 1973

[21] Appl. No.: 421,924

[30] Foreign Application Priority Data
Mar. 12, 1973 Japan.................... 48-28696

[52] U.S. Cl................... 355/106; 219/505; 354/299
[51] Int. Cl.² ................. G03B 27/30
[58] Field of Search .......... 219/216, 471; 354/297, 354/299, 300; 355/104, 106

[56] References Cited
UNITED STATES PATENTS

| | | | |
|---|---|---|---|
| 3,174,420 | 3/1965 | Aizawa | 355/106 |
| 3,224,355 | 12/1965 | Thomiszer | 355/106 |
| 3,417,226 | 12/1968 | Thomiszer | 219/216 |
| 3,432,639 | 3/1969 | Hull et al. | 219/216 |
| 3,519,253 | 7/1970 | Aser et al. | 219/216 X |
| 3,628,440 | 12/1971 | Czarnikow et al. | 219/216 X |
| 3,727,534 | 4/1973 | Low et al. | 354/300 |

FOREIGN PATENTS OR APPLICATIONS
1,548,668 10/1968 France................. 355/104

Primary Examiner—Fred L. Braun
Attorney, Agent, or Firm—Wenderoth, Lind & Ponack

[57] ABSTRACT

A copying machine of the diazo type comprises a light exposure zone for exposing to light a diazo type photosensitive sheet superposed with an original, a development zone for developing the light exposed photosensitive sheet and a delivery mechanism for feeding the original and diazo type photosensitive sheet to the light exposure zone and forwarding the light exposed photosensitive sheet to the development zone. The light exposure zone includes a transparent cylinder capable of rotating while having a superposed assembly of the original and photosensitive sheet closely contacting the outer surface thereof and a heat-generating light source mounted in the interior of the transparent cylinder. The transparent cylinder has a fan for feeding cold air into the transparent cylinder from one end thereof and cooling the outer surface of the transparent cylinder substantially uniformly along the entire length thereof and a temperature-detecting mechanism thermoconductively contacting the outer surface of the transparent cylinder to detect the temperature of the outer surface. A temperature-controlling mechanism is provided to control the air feed rate of the fan in response to signals from the temperature detecting mechanism, to control the temperature of the outer surface of the transparent cylinder within a predetermined temperature range.

13 Claims, 13 Drawing Figures

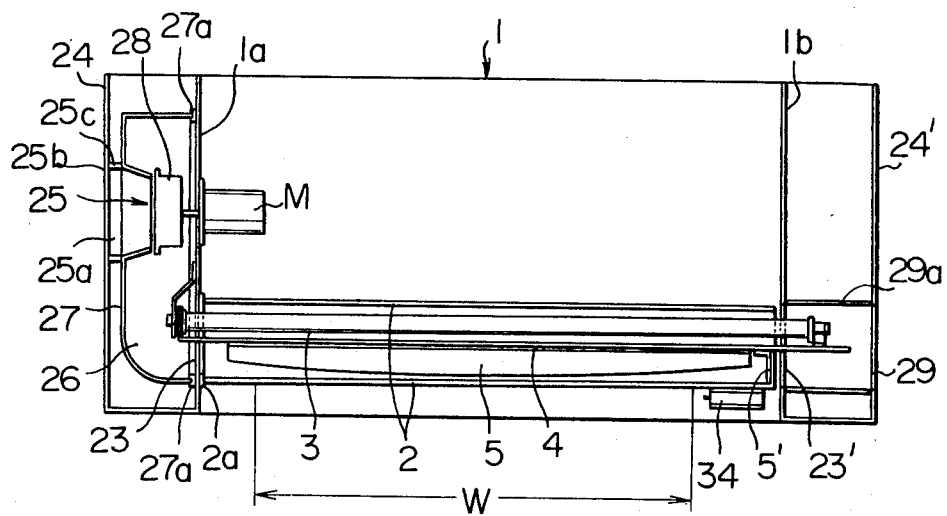
Fig. 2-A
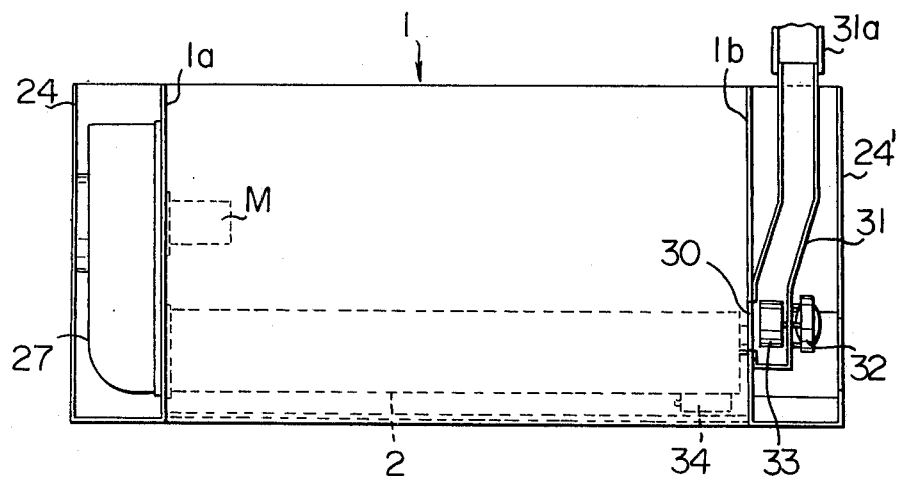
Fig. 2-B

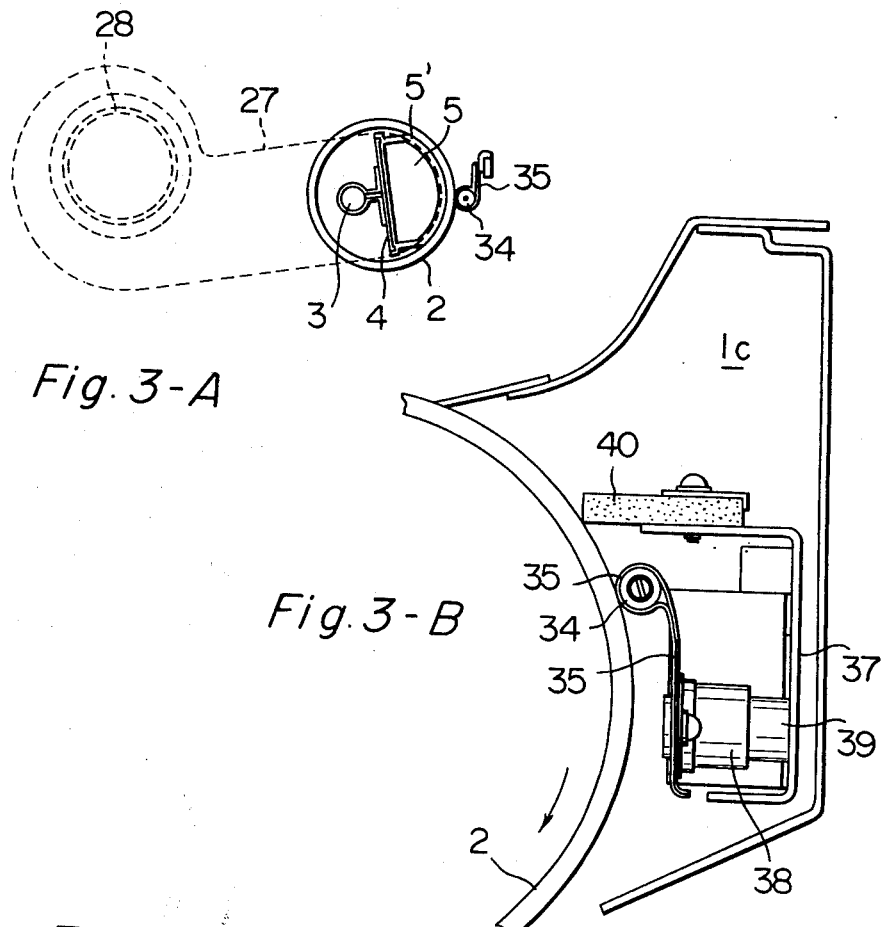
Fig. 3-A
Fig. 3-B
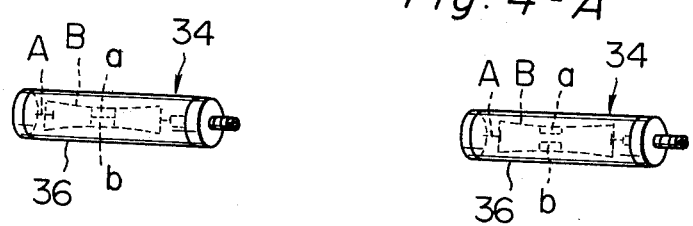
Fig. 4-B
Fig. 4-A

Fig. 5-A
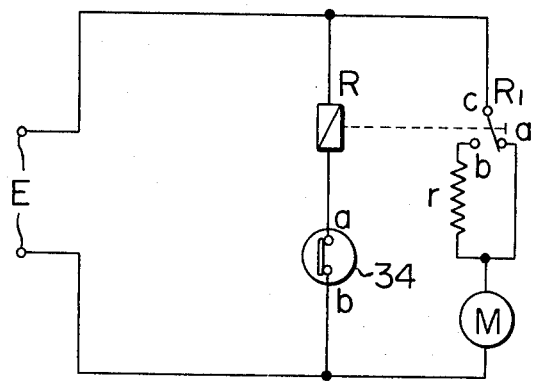
Fig. 5-B
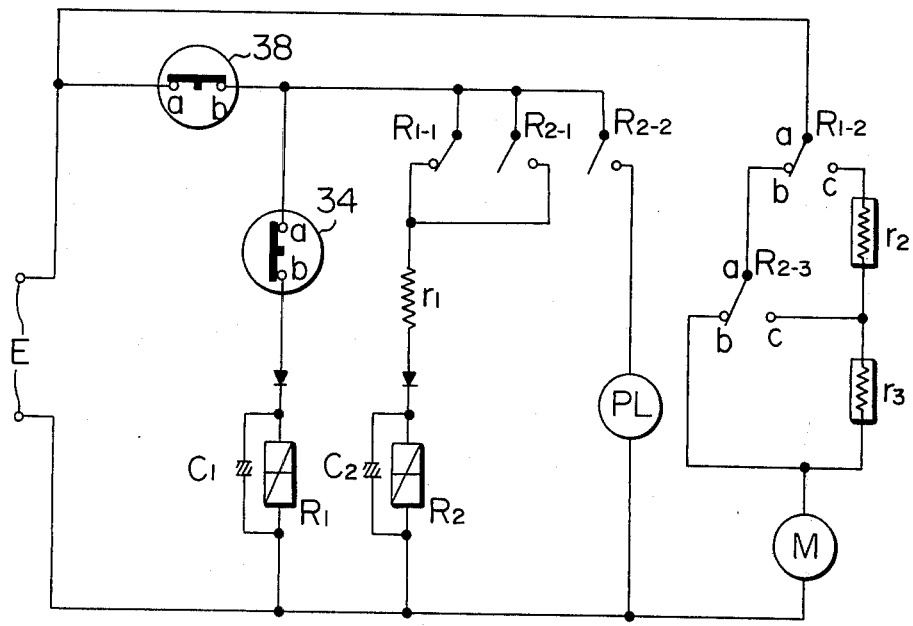

Fig. 5-C
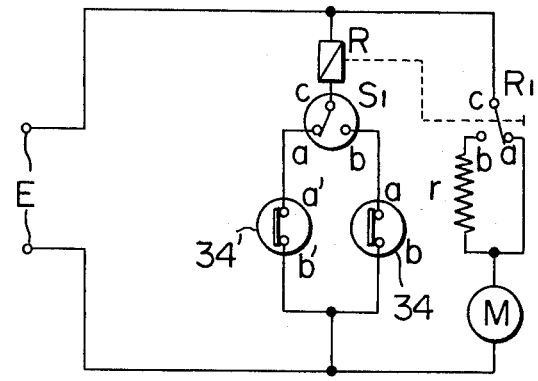
Fig. 5-D
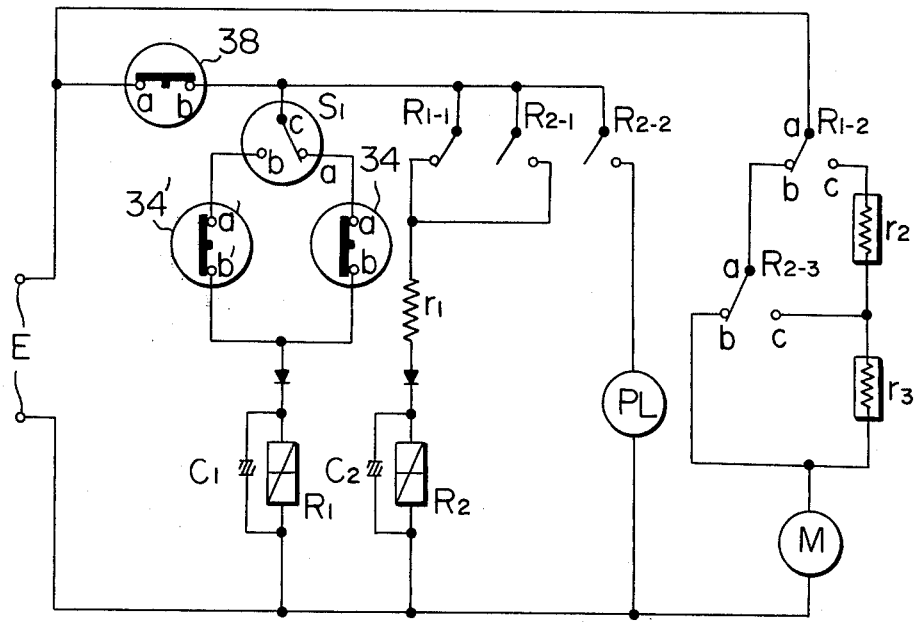

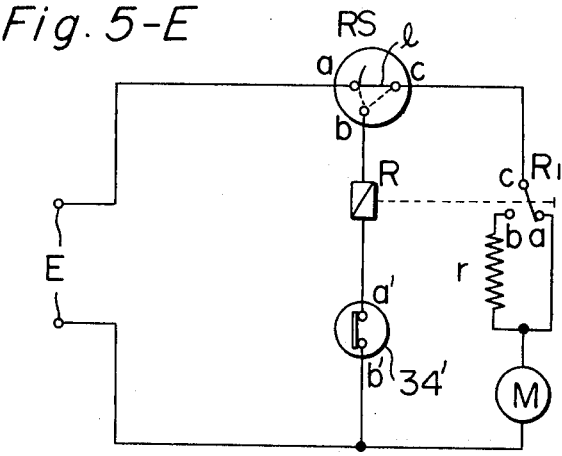
Fig. 5-E
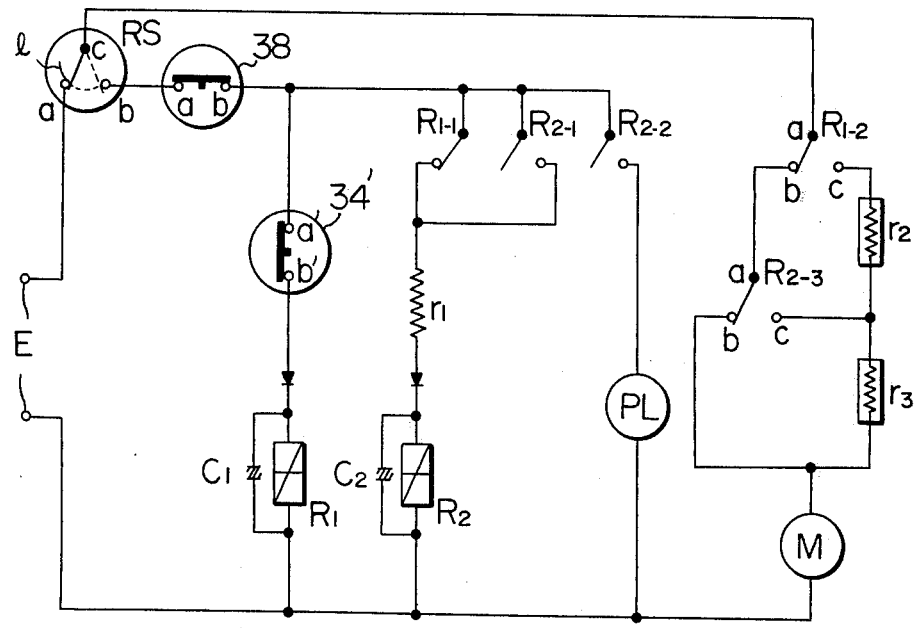
Fig. 5-F

COPYING MACHINE OF THE DIAZO TYPE

BACKGROUND OF THE INVENTION

This invention relates to a copying machine of the diazo type. More particularly, the invention relates to a copying machine of the diazo type which comprises a transparent cylinder for printing a diazo copying sheet superposed with an original and a device for controlling the surface temperature of the transparent cylinder.

In conventional copying machines of the diazo type, if the temperature of the surface of a transparent cylinder for printing a copying sheet is maintained at a high level, it is possible to accelerate the printing speed and shorten the exposure time, with the result that the copying efficiency is enhanced. However, there is a defect since at too high of a temperature an original is damaged and the copying machine may be damaged.

In contrast, if the surface temperature of the transparent cylinder is maintained at a low level in order to prevent damage to an original or to the machine, the printing speed has to be reduced and the number of copies obtaind per unit time is lessened, with the result that the copying efficiency decreases.

Further, the surface temperature of the transparent cylinder is greatly influenced by the ambient temperature and this ambient temperature varies considerably depending on the season. Accordingly, in conventional copying machines of the diazo type, the surface temperature of the transparent cylinder is set in due consideration of the foregoing point. In general, a fan having such a cooling activity that the surface temperature of the transparent cylinder is maintained at 60° to 70°C. in summer (ambient temperature being about 35°C.) is provided, such fan is continuously operated. However, when the same cooling condition is adopted for the whole year, it is impossible to obtain copies having the same image concentration and contrast throughout the year. In winter when the ambient temperature is low, a clear image cannot be obtained without reducing the printing speed. This defect has not yet been overcome.

The assignee of the instant application has proposed a process for preparing multi-colored copies which comprises the steps of (A) exposing to light a diazo type photosensitive material containing at least one diazonium salt, (B) superposing a layer of at least one thermovolatile or thermosubliming coupler on preselected areas of the diazo type photosensitive material and heating the assembly to effect transfer of the coupler, steps (A) and (B) being conducted simultaneously or in the sequence of (A) then (B), or (B) then (A) and developing the light-exposed and coupler-transferred photosensitive material in the presence of a coupler having a lower coupling rate under the development conditions than that of the volatile or subliming coupler, to obtain a multi-colored copy in which areas corresponding to preselected areas of an original have color different from that of other areas.

In a copying machine for use in practice of the above multi-color copying process, in order to effect heat transfer of a coupler, the surface temperature of a transparent cylinder should be maintained at a higher level than in ordinary diazo type copying machines, and a slight change in the temperature influences the color of a multi-color copied image. Accordingly, in order to obtain a good distinction among colors, it is necessary to maintain the surface temperature always at a constant level (for example, a temperature of 90° to 110°C.). In a copying machine provided with a perpetually operated fan having a cooling activity such as mentioned above, the surface temperature of a transparent cylinder varies depending on the change in the ambient temperature and a colored image having a desired good distinction among colors cannot be obtained. For these reasons, conventional diazo type copying machines cannot be conveniently employed for practising multi-color reproduction.

The assignee of the instant application has also proposed a copying machine applicable to either ordinary monochromatic reproduction or multi-color reproduction, in which a heat-generating member is provided in a transparent cylinder, whereby in the case of multi-color reproduction the quantity of heat generated by the heat-generating member is automatically controlled so as to maintain the surface temperature of the transparent cylinder at a constant level. However, this copying machine has a complicated structure and is expensive.

SUMMARY OF THE INVENTION

It is therefore a primary object of this invention to provide a diazo type copying machine in which the surface temperature of a transparent cylinder can always be maintained at a constant level regardless of the change in the ambient temperature and hence, copied images having the same concentration and contrast can always be obtained.

Another object of this invention is to provide a diazo type copying machine in which the temperature control of a transparent cylinder having in the interior thereof a light source capable of generating heat is accomplished by controlling the air feed rate of a fan for cooling the transparent cylinder.

Still another object of this invention is to provide a diazo type copying machine for multi-color reproduction, in which the temperature of a transparent cylinder for light exposure of a diazo type copying sheet and heat transfer of a coupler to the diazo type copying sheet is always controlled to a temperature necessary for heat transfer of the coupler without providing a particular heat-generating member in the interior of the transparent cylinder.

A still further object of this invention is to provide a diazo type copying machine for both monochromatic reproduction and multi-color reproduction, in which the temperature of a transparent cylinder can be switched and controlled to a desired temperature, namely to either a temperature, suitable for ordinary monochromatic reproduction or a temperature suitable for heat transfer of a coupler for effecting multi-color reproduction.

In accordance with this invention, there is provided a copying machine of the diazo type which comprises a light exposure zone for exposing to light a diazo type photosensitive sheet in the superposed state with an original, a development zone for developing the light exposed photosensitive sheet and a delivery mechanism for feeding the original and diazo type photosensitive paper to the light exposure zone and for forwarding the light exposed photosensitive sheet to the development zone. The light exposure zone includes a transparent cylinder capable of rotating while having a superposed assembly of the original and photosensitive sheet contacting the outer surface thereof and a heat-generating light source mounted in the interior of the transparent cylinder. The transparent cylinder has a fan for feeding cold air into the transparent cylinder from one end thereof and cooling the outer surface of the transparent cylinder substantially uniformly along the entire length thereof and a temperature-detecting mechanism thermoconductively contacting the outer surface of the transparent cylinder to detect the temperature of the outer surface. A temperature-controlling mechanism is provided to control the air feed rate of the fan in response to signals from the temperature-detecting mechanism, to control the temperature of the outer surface of the transparent cylinder within a predetermined temperature range.

This invention can be applied to any diazo type copying machine in which a superposed assembly of an original and a photosensitive sheet is exposed to light while the superposed assembly is forwarded on the periphery of a transparent cylinder while contacting the periphery by means of a delivery mechanism.

There are known various copying machines of this type. For instance, there can be mentioned a diazo type copying machine in which the original and light exposed photosensitive sheet are discharged from the machine frame after they have passed through the transparent cylinder and are separated from each other manually by an operator and the light exposed photosensitive sheet is manually inserted into the development zone. Also known is a diazo type copying machine in which the original and light exposed photosensitive sheet which have passed through the transparent cylinder are separated from each other by mechanical or pneumatic means and only the light exposed photosensitive sheet is fed to the development zone while the original separated from the photosensitive sheet is discharged from the machine frame. This invention can be applied to any of these known diazo type copying machines. Further, these known diazo type copying machines are roughly divided into a so called dry development copying machine in which the light exposed photosensitive sheet is developed by contacting it with ammonia gas and vapour, a so called wet development copying machine in which a photosensitive sheet of the one-component type is employed and after light exposure it is developed by contacting it with a liquid developer containing an alkali and a coupler, and a so called semi-dry development copying machine in which a photosensitive sheet of the two-component type is employed and after light exposure it is developed by contacting it with a limited amount of a liquid developer containing a volatile organic base or weak acid salt. This invention can be equally applied to these three types of copying machines.

BRIEF DESCRIPTION OF THE DRAWINGS

This invention will now be described in more detail by reference to the accompanying drawings, in which:

FIG. 2-A is a sectional view through the exposing device zone of FIG. 1;

FIG. 2-B is a sectional view through the developing device zone of FIG. 1;

FIG. 3-A is a side view illustrating a first embodiment of the arrangement of a temperature-detecting mechanism and a transparent cylinder in the copying machine of this invention;

FIG. 3-B is a side view illustrating a second embodiment of the arrangement of a temperature-detecting mechanism and a transparent cylinder in the copying machine of this invention.

FIGS. 4-A and 4-B are views illustrating the operation and function of a temperature-detecting mechanism to be used in the copying machine of this invention; and FIGS. 5-A, 5-B, 5-C, 5-D, 5-E and 5-F are diagrams showing electric circuits for controlling the air feed rate of a fan in response to signals from a temperature-detecting mechanism.

DETAILED DESCRIPTION OF THE INVENTION

Figure 1:
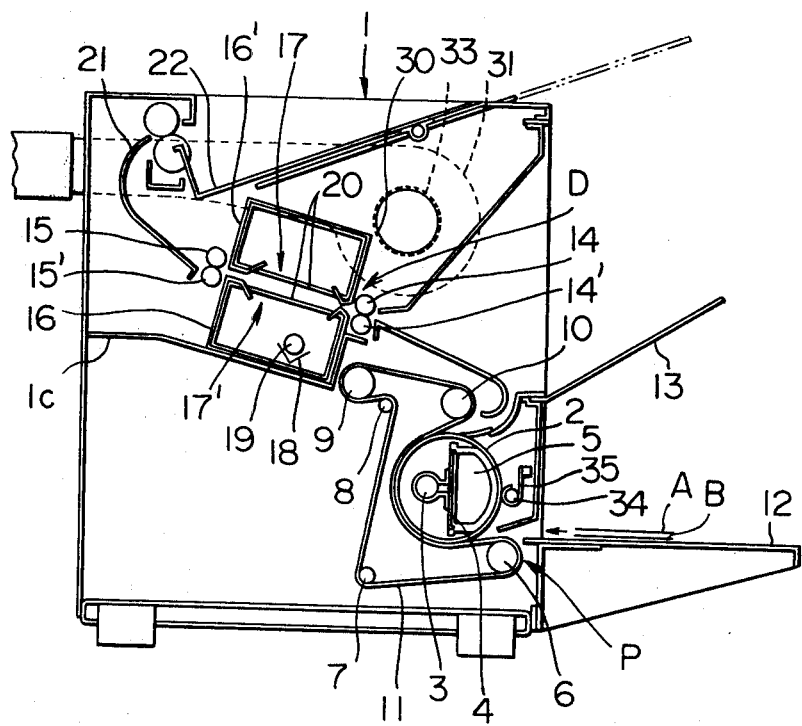
FIG. 1 is a sectional veiw illustrating diagrammatically the arrangement of mechanisms, members and devices in one embodiment of the copying machine of this invention.

In FIG. 1, a transparent cylinder 2 (cylinder glass) is rotatably positioned in a printing or light-exposing device zone P mounted in a machine frame 1, and a light source 3 for printing, a reflection plate 4 and a cold air guide plate 5 are provided in the transparent cylinder 2. A delivery belt 11 is mounted to contact the peripheral wall of the transparent cylinder through rollers 6, 7, 8, 9 and 10. A superposed assembly of an original A and a photosensitive sheet B fed from an original-inserting table 12 is forwarded and inserted between the transparent cylinder 2 and the delivery belt 11, and during this travel, the photosensitive sheet B is printed. Then, the assembly is forwarded upwardly from behind the transparent cylinder 2, and is discharged onto an original-receiving plate 13 while the original A and photosensitive sheet B are superimposed on each other. Then, they are manually separated from each other, and only the printed photosensitive sheet is then fed to a developing device zone D. Separation of the original A and photosensitive sheet B can be automatically performed by employing optional means.

In the developing device zone D, two developing tanks 16 and 16' are disposed between a pair of feed rollers 14 and 14' and a pair of discharge rollers 15 and 15' in a manner such that an opening 17 of the tank 16' confronts an opening 17' of the tank 16'. A plate 18 for evaporating aqueous ammonia and an evaporation heater 19 are provided in one developing tank 16.

Across each of the openings 17 and 17', are positioned a plurality of wires 20 so that the photosensitive sheet B is prevented from entering into the tank 16 or 16', and the movement of the photosensitive sheet B is assisted by said wires. The photosensitive sheet fed into the developing device zone D is contacted and developed with ammonia gas and vapour (steam), and the developed photosensitive sheet B is discharged on a copy receiver 22 through a guide plate 21.

In this invention, other types of dveloping devices, i.e., the wet and semi-dry types, can be optionally employed instead of the above dry type developing device.

In the copying machine illustrated in FIG. 1, since the transparent cylinder 2 has a light source 3 in its interior capable of generating heat (mercury lamp), the following arrangement is made in order to prevent an excessive rise of the surface temperature of the transparent cylinder 2. As is illustrated in FIG. 2-A, the transparent cylinder 2 is rotatably supported on both side frame 1a and 1b of the machine frame 1 (supporting means are not shown), and it is devided into two chambers, i.e., a light source chamber and a cold air guide chamber, by means of a reflection plate 4 disposed in the interior of the cylinder 2 a small distance from the inner face of the cylinder 2. In the light source chamber, the light source 3 for printing is attached to the reflection plate 4, and in the cold air guide chamber, a cold air guide plate 5 is fixed to the back face of the reflection plate 4 in a manner slightly inclined with respect to the axis of the cylinder 2. This cold air guide plate 5 is so disposed that a space is formed between the plate 5 and the inner face of the transparent cylinder 2 and this space is gradually narrowed toward both ends from the center.

On the side opposite to a cold air guide opening of the cold air guide chamber, an air barriering plate 5' is mounted on one end of the reflection plate 4 so that the plate 5' is adjacent to the inner face of the transparent cylinder 2 with a certain small separation therebetween.

By virtue of the above arrangement, cold air blown into the transparent cylinder is passed throguh the clearance between the reflection plate 4 and the transparent cylinder 2 without being directly introduced into the interior of the transparent cylinder, and then air is blown into the chamber installed with the light source.

Notches 23 and 23' are formed on side frames 1a and 1b, respectively, at points corresponding to both side ends of the transparent cylinder 2, and housings 24 and 24' are dismountably provided on both side frames 1a and 1b to cover outer faces of these side frames, respectively.

A fan case 27 having therein a cold air introducing passage 26 and an opening 25 (which may have a filter) is disposed between one housing 24 and the side frame 1a, and the cold air introducing passage 26 is connected to the chamber installed with the cold air guide plate 5, namely the cold air guide chamber in the transparent cylinder 2. Outer cold air is sucked through the cold air passage 26 via opening 25. Outer cold air is sucked into the cold air introducing passage 26 by means of a fan 28 driven by a fan motor M mounted on the frame 1a, and is blown into the cold air guide chamber in the transparent cylinder 2. The cold air is then passed through the clearance between the reflection plate 4 and the inner face of the transparent cylinder 2 and is introduced into the light source chamber where it is warmed. Then, the warmed air is discharged outside the machine frame 1 from an exhaust opening 29 formed on the other housing 24'. By the above arrangement, effective cooling can be accomplished so that the surface temperature can be maintained at a predetermined level uniformly throughout the length of the transparent cylinder.

The above outer air sucking opening 25 is completely connected to a window 25b having a filter 25a mounted on the housing 24, and is kept air-tight by a packing 25c so that only cold air outside the machine frame 1 can be drawn therein. In the apparatus of this embodiment, any fan device having such a structure as will draw in only cold air from outside the machine can be used.

It is preferred that the attachment portion of the fan case 27 to the frame 1a be kept air-tight by provision of a packing 27a, because the structure of the fan casing can thus be simplified.

It is preferred that no clearance exist between the transparent cylinder 2 and the frame 1a, between the transparent cylinder 2 and the frame 1b and between an air exhaust cylinder 29a and the housing 24', or that if any clearance be formed, its width be as small as possible. In the copying machine of this embodiment, a packing 2a is disposed between the transparent cylinder 2 and the frame 1a to provide air-tightness, whereby a sufficient cooling effect can be attained by means of a fan device of a small capacity.

In this invention, since the light source 3 generates heat and the surface temperature of the periphery of the transparent cylinder 2 is elevated, it is important to mount a fan 28 which blows cold air into the transparent cylinder 2 so that the surface temperature of the transparent cylinder 2 is maintained at a substantially constant level throughout the length of the cylinder 2. In the copying machine of this embodiment where development is accomplished with ammonia-steam, it is preferred that the inner chamber formed between confronting frames 1a and 1b be divided into upper and lower chambers by a partition wall 1c, the upper chamber being a developing device chamber D in which the above-mentioned developing device is contained and the lower chamber being a printing device room P in which the printing device is contained.

The above developing device chamber D is encircled by the partition wall 1c, a copy-receiving plate 22 and a back cover of the machine frame 1, and all ammonia gas and vapour leaking from the developing device in the chamber D is substantially caught in developing device chamber D. It is preferred that the capacity of the developing device chamber D be as small as possible, as long, as it can contain the developing device, and the open area of chamber as small as possible, so long as a photosensitive sheet can be introduced therein and withdrawn therefrom. In order to discharge the ammonia gas and vapour thus caught to a position outside the copying room, fro instance, as is shown in FIG. 2B, an exhaust gas sucking opening 30 consisting of a window cut through the frame 1b of the machine frame 1 and a fan case 31 connected to the opening 30, which also acts as an exhaust duct, are mounted in the outer chamber between the frame 1b and the housing 24', and a fan motor 32 is disposed in the fan case 31. When the structure of the developing device chamber D is arranged in the above-mentioned manner, even if the above fan has a small capacity, all of the ammonia gas and vapour is substantially discharged outside the copying room through exhaust duct 31 and a further exhaust duct 31a connected thereto. Accordingly, leakage of ammonia gas and vapour into the copying room can be effectively prevented.

In the case of a known diazo type copying machine, ammonia gas and vapour leaks from the developing device zone and fills the interior of the machine, and then leaks into the copying room, and can thus reach and influence a machine operator. Therefore, in the conventional copying machine, an opening for discharging ammonia gas and vapour is provided in the vicinity of the developing device zone, and leaking ammonia gas and vapour, as well as a large amount of air is discharged by means of a fan device of a large capacity to an appropriate point outside the machine, for example, outside the copying room. However, in the conventional copying machine of this type, it is very difficult to completely discharge ammonia gas and vapour leaking from the developing device zone unless a fan device of a very large capacity is provided. Further, the ammonia gas and vapour leaking in the copying machine can be discharged by the fan device into the transparent cylinder of the printing device zone to cool it, and that this ammonia gas and vapour can then be passed through the interior of the transparent cylinder and discharged outside the copying machine, i.e., into the copying room. If the copying operation is conducted for a long period of time, the operator will be troubled with the irritative smell of ammonia thus discharged into the copying room.

In contrast, in the above embodiment of this invention, this disadvantage involved in the conventional copying machine of the dry development type can be effectively overcome. More specifically, since the printing device zone and the development device zone are separated from each other by the partition wall in the interior of the copying machine and a fan exclusively for feeding cold air is provided in the printing device zone and another fan exclusively for discharging ammonia gas and vapour is provided in the developing device zone, even when fans of a relatively small capacity are employed, both cooling of the transparent cylinder and prevention of leakage of ammonia gas and vapour from the machine into the copying room can be effectively accomplished.

One of the important features of this invention is that the temperature-detecting mechanism for detecting the outer surface temperature of the transparent cylinder in the light exposure zone is disposed to make thermoconductive contact with the outer surface of the transparent cylinder, and a temperature-controlling mechanism is mounted to control the air feed rate of the above-mentioned fan device in response to signals from the temperature-detecting mechanism and to thereby control the outer surface temperature of the transparent cylinder within a predetermined temperature range. In this invention, the fan device heretofore used for cooling the light source or transparent cylinder is utilized, and the air feed rate of such fan device is controlled by a combination of the temperature-detecting mechanism making thermoconductive contact with the transparent cylinder and the temperature-controlling mechanism, whereby the outer surface temperature of the transparent cylinder can be maintained accurately and easily within a predetermined temperature range.

To embody this feature, as illustrated in FIGS. 2-A and 3, a temperature-detecting mechanism 34 is disposed on the peripheral surface of the transparent cylinder 2 and makes thermoconductive contact with said peripheral surface. Any temperature-detecting means such as a thermocouple, a thermistor and or a thermostat can optionally be used as the temperature-detecting mechanism 34, and use of a Sensbey (tradename for a thermostat manufactured by Nippon Dennetsu Keiki K. K.) such as shown in FIGS. 4-A and 4-B is especially preferred. In the thermostat 34, with an increase of the temperature an outer cylinder 36 expands and a portion A (anchor pin) is brought into contact with a portion B (base), and when the temperature exceeds the predetermined level, the cylinder 36 is further elongated and the contacts a and b are opened (see FIG. 4-A). When the temperature is below the predetermined level, the uter cylinder 36 is in the contracted state and the portion A (anchor pin) is separate from the portion B (base), so that the contacts a and b are in the closed state (see FIG. 4-B).

The position of the temperature-detecting mechanism is not particularly critical, but it is preferred that, as is illustrated in FIG. 2-A, the size of the transparent cylinder 2 be made substantially greater than the effective light exposure width W and the temperature-detecting mechanism 34 is disposed so that it makes thermoconductive contact with the outer surface of the transparent cylinder 2 at a position outside the region of effective light exposure width W. When the temperature-detecting mechanism is disosed at such position, formation of a scar or the like on the transparent cylinder, which has bad influence on printing of a copying sheet, can be effectively prevented. It is also preferred that this temperature-detecting mechanism 34 be disposed so that it makes thermoconductive contact with the outer surface of the transparent cylinder 2 at a position on the side opposite to the transfer passage through which the superposed assembly of the original A and copying sheet B travels while making contact with the transparent cylinder 2 (namely, at a position on the right side in FIG. 1).

Various methods can be adopted for bringing the temperature-detecting mechanism into thermoconductive contact with the outer surface of the transparent cylinder 2. For example, the temperature-detecting mechanism 34 can be directly positioned against the outer surface of the transparent cylinder 2 by means of an elastic member 35 such as a spring, as is shown in FIG. 1 and FIG. 3-A. It is also possible to make elastic member 35 thermoconductive so that a part of the thermoconductive elastic member 35 is pressed to have a contact with the outer surface of the transparent cylinder 2 and the heat of the transparent cylinder 2 is transferred to the temperature-detecting mechanism 34 through elastic member 35.

In this invention, a switch that can be turned on or off depending on signals from the temperature-detecting mechanism 34 is used as the temperature-controlling mechanism. As shown in FIG. 5-A, the motor M for driving the fan 28 is connected to an electric source through one contact (normally closed) of the switch directly or via a resistor connected to the other contact (normally open) of the switch. By change-over of this temperature-controlling mechanism, the output to the fan-driving motor M, i.e., the rate of rotation of the fan, can be controlled, whereby control of the temperature of the transparent cylinder can be accomplished easily and assuredly by a much simplified mechanism.

In FIG. 5-A, showing an example of an electric circuit of the temperature-detecting mechanism and temperature-controlling mechanism illustrated in FIG. 3-A, one end of an electric source E is connected to one end of a relay R and a terminal c of a relay or change-over switch R1 of the relay R. The other end of the relay R is connected to the other end of the electric source E through the temperature-detecting mechanism 34, such as the above mentioned Sensbey device. The terminal c of the relay switch R1 is connected to one end of the fan motor M through a normally closed contact a of the relay switch R1, and a normally open contact b of the relay switch R1 is connected to one end of the fan motor M through a resistance r. The other end of the fan motor M is connected to the other end of the electric souce E.

When the copying machine of this embodiment is employed for ordinary monochromatic reproduction of the diazo type, the temperature for acutation of the temperature-detecting mechanism 34 is predetermined to be within a range of 60° to 70°C. and the temperature-detecting member 34 is so arranged that when the temperature is below such predetermined level, the contacts a and b of the mechanism 34 are in the closed state, and when the temperature is elevated to such predetermined level, the contacts a and b of the temperature-detecting mechanism 34 are opened. Accordingly, at the start of the copying operation, the surface temperature of the transparent cylinder 2 is lower than the predetermined temperature and the contacts *a* and *b* of the temperature-detecting mechanism 34 are in the closed state. Therefore, an electric current is allowed to pass through the relay R to close the normally open contact *b* of the relay switch R1 and rotate the fan motor M at a speed reduced by the resistance *r*, which results in an increase of the surface temperature of the transparent cylinder 2. Instead of the resistance *r* being connected to tthe normally open contact *b* of the relay switch R1, it is possible to adopt such an arrangement that when the contact of the relay switch R1 is changed to the side of the normally open contact *b*, the rotation of the fan motor M is stopped. However, it is generally more preferred to provide the above resistance *r*. When the surface temperature of the transparent cylinder 2 reaches the predetermined level, the contacts *a* and *b* of th temperature-detecting mechanism 34 are opened to cloe the normally closed conact *a* of the relay switch R1, whereby the fan motor M is rotated at full speed to cool the transparent cylinder 2 so that the temperature of the cylinder will not be further elevated.

Thus, by repeating the above switch-over of the fan motor M, the surface temperature of the transparent cylinder 2 can be maintained at the desired predetermined level and therefore, clear copied images can always be obtained at a constant printing rate.

In this invention, it is preferred that a cleaning mechanism be mounted to have a contact with the peripheral face of the transparent cylinder along the periphery inclusive of the area in which the temperature-detecting mechansim contacts the transparent cylinder and that the width of the contact of this cleaning mechanism with the peripheral face of the transparent cylinder not be smaller that the width of the contact of the temperature-detecting mechanism with the peripheral face of the transparent cylinder.

More specifically, in this preferred embodiment of the invention, even when the copying machine is employed for a long period of time, accumulation or sticking of dust or the like on the contact area of the temperature-detecting mechanism and transparent cylinder is prevented and the temperature of the outer surface of the transparent cylinder can be detected with certainty and without a time delay. A sweeping member composed of a heat-resistant fibrous material such as felt is used as the cleaning mechanism. It is desired that this sweeping member be disposed upstream of the contact area of the peripheral face of the transparent cylinder and the temperature-detecting member and in the vicinity of such contact area.

In this invention, one or more temperature-detecting mechanisms can be mounted for detecting the temperature of the outer surface of the transparent cylinder. For example, the outer surface of the transparent cylinder should be maintained at different temperatures depending on the kind of reproduction, whether monochromatic reproduction or multi-color reproduction. Thus, in case a plurality of temperature ranges should be predetermined, it is possible to provide a plurality of temperature-detecting mechanisms of a number corresponding to the number of the predetermined temperature ranges. Further, in this invention it is possible to provide a plurality of temperature-detecting mechanisms for one predetermined temperature range. In this case, the rotation rate can be changed variously, for instance, a low speed, a middle speed and a high speed, whereby the temperature control can be performed more precisely and accurately. Furthermore, by provision of a plurality of such mechanisms, it is possible to increase the surface temperature of the transparent cylinder in a short time to the predetermined level at the start of the copying operation or to lower the surface temperature of the transparent cylinder in a short time when it increases abruptly due to one trouble or other.

In FIG. 3-B, illustrating another arrangement of the temperature-detecting mechanism of this invention, a first temperature-detecting mechanism 34 is mounted on a frame member 37 fixed to the the frame 1c through an elastic member 35. A second temperature-detecting mechanism 38 is mounted, separately from the first temperature-detecting mechanism 34, on frame member 37 through the heat-conductive elastic member 35 to detect the surface temperature of the transparent cylinder 2. When the first temperature-detecting mechanism becomes inoperative due to trouble or time lag and it fails to correctly detect the surface temperature of the transparent cylinder, the second temperature-detecting mechanism 38 is actuated to prevent breakage of the transparent cylinder or the starting of a fire by super-heating. Therefore, the predetermined temperature of this second temperature-detecing mechanism 38 is maintained at a level higher than the predetermined temperature of the first temperature-detecting mechanism 34, but the predetermined temperature of the second temperature-detecting mechanism 38 is adjusted to a level lower than such a temperature as will cause trouble to any member of the copying machine.

The above-mentioned elastic member 35 is fixed to the frame member 37 through a heat-insulating member 39 composed of BAKELITE (trademark of Bakelite Corporation) or the like so that the heat transferred to the elastic member 35 is not released to the outside and the surface temperature of the transparent cylinder can be correctly detected by the first and second temperature-detecting mechanisms 34 and 38. A cleaning mechanism 40 composed of a sweeper of a heat-resistant fibrous material such as felt or a sponge sweeper is mounted on the outside of the frame member 37 to clean the peripheral surface of the transparent cylinder 2, and dust or the like stuck on the peripheral surface of the transparent cylinder 2 is removed by this cleaning mechanism 40, whereby the thermoconductive contact between the peripheral surface of the transparent cylinder and the temperature-detecting mechanism can be kept in good condition and the surface temperature of the transparent cylinder can be detected correctly and promptly by the temperature-detecting mechanism 34. It is preferred that the width of the cleaning mechanism 40 be no smaller than the width of the temperature-detecting mechanism 34 and that the cleaning mechanism 40 be disposed upstream of the temperature-detecting mechanism on the peripheral surface of the transparent cylinder 2 and outside the effective light exposure width W of the cylinder 2.

A mechanism having such a structure as illustrated hereinabove by reference to FIG. 3-A can be used as the first temperature-detecting mechanism, and as the second temperature-detecting mechanism there can be employed, for example, a thermocouple, a thermistor or a thermostat, e.g., a Sensbey device. It is especially preferred to employ as the second temperature-detecting mechanism 38 a special thermostat having such a structure that once it detects the predetermined temperature, it is not actuated again before the temperature becomes much lower than the predetermined temperature. As such thermostat, there can be mentioned, for example, a Klixon (trademark for a thermostat manufactured by Texas Instruments Co.).

In the above embodiment of this invention, when the temperature of the outer surface of the transparent cylinder reaches the predetermined temperature of the first temperature-detecting mechanism, the fan 28 is rotated at a middle speed and cools the transparent cylinder 2 to reduce the surface temperature thereof. When the temperature of the outer surface of the transparent cylinder is lower than the predetermined temperature, the speed of the fan 28 is reduced or the fan 28 is stopped, so that the surface temperature of the transparent cylinder 2 is elevated. When the surface temperature of the transparent clinder 2 is made higher than such predetermined temperature by an accident to or trouble with the first temperature-detecting mechanism 34 and it reaches the predetermined temperature of the second temperature-detecting mechanism 38, this second temperature-detecting mechanism 38 is actuated to rotate the fan 28 at full speed and thereby cool the transparent cylinder 2 promptly to reduce the surface temperature of the transparent cylinder 2. This feature is embodied by a temperature-controlling mechanism having a structure detailed below.

For example, as is illustrated in FIG. 5-B, a contact $a$ of a second temperature-detecting mechanism 38, composed of a Klixon, and a terminal $a$ of a relay contact R1-2 of a relay R1 are connected to one end of an electric source E, and a contact a of a first temperature-detecting mechanism 34 composed of a Sensbey, a normally closed contact R1-1 of the relay R1 and normally open relay contacts R2-1 and R2-2 of a relay R2 are connected to a contact $b$ of the second temperature-detecting mechanism 38. A contact $b$ of the first temperature-detecting mechanism 34 is connected through a rectifier to one end of the relay R1 which is connected in parallel to a condenser C1. The normally closed relay contact R1-1 of the relay R1 and the normally open relay contact R2-1 of the relay R2 are connected throhgh a resistance $r1$ and a rectifier to one end of the relay R2 connected in parallel to a condenser C2. The normally open relay contact R2-2 of the relay R2 is connected to a pilot lamp PL.

The normally closed contact $b$ of the relay contact R1-2 of the relay R1 is connected to the fan motor M through a normally closed contact $b$ of relay contact R2-3 of the relay R2, and a normally open contact $c$ of the relay contact R1-2 is also connected to the fan motor M through resistances $r2$ and $r3$. A normally open contact $c$ of the relay contact R2-3 is also connected to the fan motor M through the resistance $r3$.

In case ordinary monochromatic diazo type reproduction is being conducted, when the predetermined temperature of the first temperature-detecting mechanism 34 is within a range of 60° to 70°C., since the surface temperature of the transparent cylinder 2 is lower than such predetermined temperature at the start of the copying operation, the contacts $a$ and $b$ of the first temperature-detecting mechanism 34 are closed to apply an electric current to the relay R1, whereby the normally closed relay contact R1-1 is opened and no electric current is applied to the relay R2, with the result that the pilot lamp PL indicating that the copying operation is possible is not lighted. Further, since an electric current is applied to the relay R1, the normally closed contact $b$ of the relay contact R1-2 is opened and the normally open contact $c$ is closed, whereby the fan motor M is actuated through the resistances $r2$ and $r3$ and it is rotated only at a low speed, with the result that increase of the surface temperature of the transparent cylinder 2 is not inhibited by the rotation of the fan 28.

Thus, the surface temperature of the transparent cylinder 2 is gradually increased by the heat-generating light source 3 and it reaches the predetermined temperature of the first temperature-detecting mechanism 34. At this point, the contacts $a$ and $b$ of the first temperature-detecting mechanism 34 are opened, application of the electric current to the relay R1 is stopped to close the normally closed relay contact R1-1, whereby the electric current is applied to the relay R2 and the normally open relay contact R2-1 is closed to effect the self-retention of the relay R2. Simultaneously, the normally open relay contact R2-2 is closed to light the pilot lamp PL to thereby indicate that the copying operation is now possible. Furthermore, the normally open contact $c$ of the relay contact R1-2 of the relay 1, which has been closed, is opened, the normally closed contact $b$ is turned in the closed state, and the normally open contact $c$ of the relay contact R2-3 of the relay R2 is closed, whereby the electric current is applied to the fan motor M only through the resistance $r3$ and the fan motor M is rotated at a middle speed to cool the surface of the transparent cylinder 2.

When the surface temperature of the transparent cylinder is again made lower than the predetermined temperature, the contacts $a$ and $b$ of the first temperature-detecting mechanism 34 are closed again and the electric current is applied to the relay R1 to open the normally closed relay contact R1-1. However, since the relay R2 is self-retained by the normally open contact R2-1 as mentioned above, the normally open relay contact R2-2 is kept in the closed state and the pilot lamp PL is not put out. Further, since the electric current is applied to the relay R1, the normally closed contact $b$ of the relay contact R1-2 is opened and hence, the fan motor M is actuated through the resistances $r2$ and $r3$, with the result that the fan motor M is rotated at a low speed and the surface temperature of the transparent cylinder is increased again.

Since the surface temperature of the transparent cylinder 2 can always be maintained at a desired level in the foregoing manner, clear copied images can always be obtained at a constant printing rate.

In the copying machine of this embodiment, if the contacts $a$ and $b$ of the first temperature-detecting mechanism 34 are kept closed by an accident to or trouble with mechanism 34 even when the surface temperature of the transparent cylinder exceeds the predetermined level, when the surface temperature is further increased and reaches the predetermined temperature of the second temperature-detecting mechanism 38 (for example, 140° to 150°C.), the contacts $a$ and $b$ of mechanism 38 are opened to close the normally closed relay contact R1-1, open the normally open contact R2-1 and open the normally open relay contact R2-2, whereby the pilot lamp PL is put out to indicate that the copying operation is now impossible. Simultaneously, the electric current is applied to the fan motor M through the normally closed contact $b$ of the relay contact R1-2 and the normally closed contact $b$ of the relay contact R2-3, whereby the fan motor M is rotated at full speed and the transparent cylinder is cooled promptly. When the surface temperature of the transparent cylinder 2 is thus lowered to about 50°C., the contacts *a* and *b* of the second temperature-detecting mechanism 38 are closed again, and the original state is restored.

By provision of the above temperature-detecting and temperature-controlling mechanisms, the occurrence of a fire can be prevented without damage or trouble to the transparent cylinder and other members. Therefore, in view of the life and safety of the copying machine, this embodiment of the invention is very much preferred.

The copying machine of this invention is useful for diazo type multi-color reproduction in which while a superposed assembly of an original and a diazo type copying sheet passes through the zone of a transparent cylinder, both printing of the diazo type copying sheet and heat transfer of a coupler to the copying sheet may be simultaneously accomplished. This invention is especially effectively applicable to a diazo type copying machine for both monochromatic reproduction and multi-color reproduction. In the diazo type multi-color reproduction process, an original having a layer of a thermovolatile or thermosubliming coupler at preselected areas of the face confronting a diazo type photosensitive layer of a copying sheet is employed, and light exposure of the image through the original and heat transfer of the coupler are accomplished while the original and copying sheet pass through the transparent cylinder. In the diazo type copying machine for multi-color reproduction according to this invention, the temperature of the transparent cylinder is maintained within a range suitable for heat transfer of a coupler such as mentioned above by the combination of the above-mentioned temperature-detecting mechanism, temperature-controlling mechanism and fan.

In case this invention is applied to a diazo type copying machine for both monochromatic reproduction and multi-color reproduction, the temperature-detecting mechanism includes a temperature-detecting mechanism for monochromatic reproduction which causes the temperature-controlling mechanism to control the temperature of the outer surface of the transparent cylinder within a first predetermined temperature range suitable for monochromatic reproduction and a temperature-detecting mechanism for multi-color reproduction which causes the temperature-controlling mechanism to control the temperature of the outer surface of the transparent cylinder within a second predetermined temperature range suitable for multi-color reproduction, which is higher than the first predetermined temperature range, and a change-over switch mechanism is provided to actuate selectively either the temperature-detecting mechanism for monochromatic reproduction or the temperature-detecting mechanism for multi-color reproduction at the copying operation.

In the case of the copying machine for both monochromatic reproduction and multi-color reproduction, as the temperature-controlling circuit, there can be employed those shown in FIGS. 5-C and 5-D instead of the temperature-controlling circuits shown in FIGS. 5-A and 5-B. For example, as is illutrated in FIG. 5-D, the contact *b* of the second temperature-detecting mechanism 38 is connected to a terminal *c* of a change-over switch S1, and a contact *a* for monochromatic reproduction and a contact *b* for multi-color reproduction of switch S1 are connectd through two temperature-detecting mechanisms 34 and 34' differing in the predetermined temperature thereof respectively, and through a rectifier to one end of a relay R1 connected in parallel to a condenser C1. The predetermined temperature of the temperature-detecting mechanism 34 for monochromatic reproduction is set to 60° to 70°C. and the predetermined temperature of the temperature-detecting mechanism 34' for multi-color reproduction is set to 90° to 110°C. When the change-over of the temperature-detecting mechanisms 34 and 34' for monochromatic reproduction and for multi-color reproduction is accomplished by the above change-over switch S1, in the manner as illustrated hereinabove by reference to FIG. 5-B, the surface temperature of the transparent cylinder 2 is maintained at a level suitable for monochromatic reproduction or multi-color reproduction. The connection and operation in the temperature-controlling electric circuit shown in FIG. 5-C are similar to those illustrated above in connection with the temperature-controlling electric circuit shown in FIG. 5-D. Therefore, detailed explanation of the circuit shown in FIG. 5-C is omitted.

In case importance is attached to multi-color reproduction while influence of the change of the ambient temperature on quality of monochromatic copied images are ignored, it is possible to arrange the machine so that at the time of monochromatic reproduction a fan is rotated at a constant speed with no particular control of the temperature and only at the time of multi-color reproduction the control of the temperature of the surface of the transparent cylinder is accomplished by the combination of the temperature-detecting mechanism, temperature-controlling mechanism and air-feeding device. In this case, temperature-controlling circuits shown in FIGS. 5-E and 5-F can be employed instead of the circuits shown in FIGS. 5-C and 5-D.

For instance, as is illustrated in FIG. 5-F, one end of an electric source E is connected to a contact *a* of a rotary switch RS, and a contact *b* of rotary switch RS is connected to the contact *a* of the second temperature-detecting mechanism 38, while a terminal *c* of the rotary switch RS is connected to the terminal *a* of the relay contact R1-2. When only the contact *a* is connected to the terminal *c* by an L-figured piece l, monochromatic reproduction is conducted, and in the case of multi-color reproduction, both the contact *a* and the contact *b* are connected to the terminal *c* by changing the position of the L-figured piece l as indicated by a dotted line.

In this embodiment, as in the conventional copying machine, a fan 28 which is always rotated at full speed and is adapted to maintain the surface temperature of the transparent cylinder 2 at 60° to 70°C. (in summer about 35°C.) is employed. In the case of monochromatic reproduction, an electric current is applied to the fan motor M through the contact *a* and terminal *c* of the rotary switch RS, the normally closed contact *b* of the relay contact R1-2 and the normally closed contact *b* of the relay contact R2-3, and the fan motor M is always rotated at full speed. In the case of multicolor reproduction, the L-figured piece l is changed over and as illustrated above in connection with FIG. 5-B, when the surface temperature of the transparent cylinder 2 is lower than the predetermined temperature, the contacts *a'* and *b'* of the temperature-detecting mechanism 34' are closed to apply an electric current to the relay R1, whereby the normally closed contact *b* of the relay contact R1-2 is opened, the normally open contact c is closed and the fan motor M rotated at a low speed through the resistances r2 and r3. When the surface temperature of the transparent cylinder 2 reaches the predetermined temperature, the contacts a' and b' of the temperature-detecting mechanism 34' are opened, and therefore, the fan motor M is rotated at a middle speed.

In the foregoing manner, the surface temperature of the transparent cylinder 2 can always be maintained within the predetermined range, and therefore, desired multi-colored copies in which colors are constantly distinguished from one another can be obtained. In case an electric circuit such as shown in FIG. 5-F is employed, a copying machine of a simpler structure and a cheaper cost than in the case of the electric circuit shown in FIG. 5-D can be provided.

The connection and operation of the temperature-controlling electric circuit shown in FIG. 5-E will be apparent those skilled in the art from the foregoing explanation.

In accordance with this invention, the surface temperature of a transparent cylinder can be maintained within a certain predetermined range accurately and assuredly by a relatively simple structure of a fan device to be used for a light source or such transparent cylinder, a temperature-detecting mechanism and a temperature-controlling mechanism, whereby copied images of constant concentration and contrast can be obtained at a constant printing rate with good reproducibility regardless of the change of the ambient temperature. Further, in this invention, when the above-mentioned temperature-detecting mechanism is disposed in the above-mentioned specific arrangement together with the above-mentioned cleaning mechanism, the temperature of the transparent cylinder can be correctly detected without disturbing the operation of printing copying sheets, and therefore, the temperature of the outer surface of the transparent cylinder can be controlled more accurately and assuredly.

Another advantage of this invention is that an ordinary diazo type copying machine for monochromatic reproduction can be used for multi-color reproduction without provision of a particular apparatus or device.

What we claim is:

1. A copying machine of the diazo type, said machine comprising:
   a light exposure zone for exposing to light a diazo type photosensitive sheet superposed with an original;
   a development zone for developing a light exposed photosensitive sheet;
   a delivery mechanism operatively positioned for feeding the original and diazo type photosensitive sheet to said light exposure zone and for forwarding the light exposed photosensitive sheet to said development zone;
   a transparent cylinder positioned in said light exposure zone and capable of rotating with a superposed assembly of the original and photosensitive sheet contacting the outer surface thereof;
   a heat-generating light source mounted in the interior of said transparent cylinder;
   fan means continuously rotated by a continuously operable driving motor for feeding cold air into said transparent cylinder from a first end thereof and cooling the outer surface of said transparent cylinder substantially uniformly along the entire length thereof;
   a temperature-detecting means thermoconductively contacted with the outer surface of said transparent cylinder to detect the temperature of said outer surface;
   a temperature controlling means coupled to said temperature-detecting means and said motor for controlling the air feed rate of said fan means in response to signals from said temperature-detecting means, to control the temperature of the outer surface of said transparent cylinder within a predetermined temperature range;
   said temperature controlling means comprising a change-over switch mechanism having a plurality of contacts; and
   said motor being connected directly to a first contact of said change-over switch mechanism and through a resistor to a second contact of said change-over switch mechanism, said motor rotating said fan at a fixed speed when said first contact is closed and at a lower speed than the fixed speed when said second contact is closed, said switch mechanism being adapted to be changed over and actuated in response to signals from said temperature-detecting means, the rotating speed of said fan means thus being controlled by the change-over of said switch mechanism in response to signals from said temperature-detecting means.

2. A copying machine as claimed in claim 1, further comprising a cleaning mechanism mounted along and in contact with the peripheral face of said transparent cylinder inclusive of the area at which said temperature-detecting means contacts said peripheral face of said transparent cylinder, and the width of the contact of said cleaning mechanism with said peripheral face of said transparent cylinder being at least as large as the width of the contact of said temperature-detecting means with said peripheral face of said transparent cylinder.

3. A copying machine as claimed in claim 2, wherein said cleaning mechanism is a sweeping member composed of a heat-resistant fibrous material, and said sweeping member is disposed upstream of the position of the contact of said temperature-detecting means with said peripheral face of said transparent cylinder but in the vicinity of said contact position.

4. A copying machine as claimed in claim 1, wherein said temperature-detecting means is a thermostat.

5. A copying machine as claimed in claim 1, wherein the said temperature-detecting means is pressed against the outer surface of said transparent cylinder by an elastic member.

6. A copying machine as claimed in claim 1, further comprising a heat-conductive elastic member disposed so that a part of said member is pressed against the outer surface of said transparent cylinder, and said temperature-detecting means detects the temperature of said transparent cylinder through said elastic member.

7. A copying machine as claimed in claim 1, wherein the size in the axial direction of said transparent cylinder is substantially greater than the effective light exposure width, and said temperature-detecting means is disposed so that it is in thermoconductive contact with the outer surface of the transparent cylinder at a position outside said effective light exposure width.

8. A copying machine as claimed in claim 1, wherein said temperature-detecting means is disposed so that it makes thermoconductive contact with the outer surface of said transparent cylinder on a side thereof opposite to the side of a delivery passage through which the superposed assmbly of the original and photosensitive sheet travels while in contact with said transparent cylinder.

9. A copying machine as claimed in claim 1, wherein said transparent cylinder is divided into first and second chambers by a fixed reflection plate disposed a small distance from the inner face of said cylinder, said light source being mounted on said reflection plate in said first chamber, and cold air-distributing means being disposed in said second chamber, and one of said two chambers of the transparent cylinder being connected to said fan means through a duct, and the other of said two chambers being connected to the outside of the machine.

10. A copying machine as claimed in claim 9, wherein said transparent cylinder is rotatably supported on spaced and confronting frames, and the portion at which said transparent cylinder is connected to said duct is kept substantially airtight by a packing member.

11. A copying machine of the diazo type, said machine comprising:
 a light exposure zone for exposing to light a diazo type photosensitive sheet superposed with an original;
 a development zone for developing a light exposed photosensitive sheet;
 a delivery mechanism operatively positioned for feeding the original and diazo type photosensitive sheet to said light exposure zone and for forwarding the light exposed photosensitive sheet to said development zone;
 a transparent cylinder positioned in said light exposure zone and capable of rotating with a superposed assembly of the original and photosensitive sheet contacting the outer surface thereof;
 a heat-generating light source mounted in the interior of said transparent cylinder;
 fan means operatively mounted for feeding cold air into said transparent cylinder from a first end thereof and for cooling the outer surface of said transparent cylinder substantially uniformly along the entire length thereof;
 a temperature-detecting means thermoconductively contacted with the outer surface of said transparent cylinder to detect the temperature of said outer surface;
 a temperature controlling means coupled to said temperature-detecting means and said fan means for controlling the air feed rate of said fan means in response to signals from said temperature-detecting means, to control the temperature of the outer surface of said transparent cylinder within a predetermined temperature range;
 said temperature-detecting means including a first temperature-detecting mechanism adapted to detect a predetermined temperature which approximates the predetermined temperature range of the outer surface of said transparent cylinder and a second temperature-detecting mechanism adapted to detect a predetermined temperature which is higher than said predetermined temperature range of said transparent cylinder; and
 said temperature-controlling means including a change-over switch mechanism means for rotating said fan means at a fixed speed to maintain the temperature of the outer surface of said transparent cylinder when said temperature reaches the predetermined temperature of said first temperature-detecting mechanism, for rotating said fan means at a speed lower than said fixed speed to raise the temperature of the outer surface of said transparent cylinder when said temperature is lower than the predetermined temperature of said first temperature-detecting mechanism, and for rotating said fan means at a speed higher than said fixed speed to lower the temperature of the outer surface of said transparent cylinder when said temperature is higher than the predetermined temperature of said first temperature-detecting mechanism and reaches the predetermined temperature of said second temperature-detecting mechanism.

12. A copying machine of the diazo type to be applied to both monochromatic reproduction and multicolor reproduction, said machine comprising:
 a light exposure zone for exposing to light a superposed assembly of a diazo type photosensitive sheet and an original having thereon a layer of a heat-transferable coupler at preselected areas of the surface thereof confronting a photosensitive layer of said photosensitive sheet and for heat-transferring the coupler onto the diazo type photosensitive sheet;
 a development zone for developing a light-exposed and coupler-transferred photosensitive sheet;
 a delivery mechanism operatively positioned for feeding the original and diazo type photosensitive sheet to said light exposure zone and for forwarding the light-exposed and coupler-transferred photosensitive sheet to said development zone;
 a transparent cylinder positioned in said light exposure zone and adapted for rotating with a superposed assembly of the original and photosensitive sheet contacting the outer surface thereof;
 a heat-generating light source mounted in the interior of said transparent cylinder;
 fan means operatively positioned for feeding cold air into said transparent cylinder from a first end thereof and for cooling the outer surface of said transparent cylinder substantially uniformly along the entire length thereof;
 a temperature-detecting means thermoconductively contacted with the outer surface of said transparent cylinder to detect the temperature of said outer surface;
 a temperature controlling means coupled to said temperature detecting means and said fan means for controlling the air feed rate of said fan means in response to signals from said temperature-detecting means, to control the temperature of the outer surface of said transparent cylinder within a predetermined temperature range;
 said temperature-detecting means including a first temperature-detecting mechanism for monochromatic reproduction which causes said temperature controlling means to control the temperature of the outer surface of said transparent cylinder to within a first predetermined temperature range suitable for light exposure for monochromatic reproduction, and a second temperature-detecting mechanism for multi-color reproduction which causes said temperature controlling means to control the temperature of the outer surface of said transparent cylinder to within a second predetermined temperature range suitable for light exposure and heat transfer of the coupler for multi-color reproduction, said second predetermined temperature range being higher than said first predetermined temperature range; and a change-over switch means, having first and second contacts respectively connected to said first and second temperature-detecting mechanisms, for selectively actuating said first temperature-detecting mechanism for monochromatic reproduction and said second temperature-detecting mechanism for multi-color reproduction.

13. A copying machine as claimed in claim 12, further comprising means for developing the photosensitive sheet by gasifying aqueous ammonia and applying the resulting ammonia gas and vapor to the photosensitive sheet in said development zone; the machine having an inner chamber defined by a pair of side frames and two outer chambers formed outside said side frames by respective housings, said inner chamber being divided into first and second inner chambers by a partition wall, said development zone being disposed in said first inner chamber and the light exposure zone being disposed in said second inner chamber; said fan means including a fan case having an opening for sucking cold air only from the outside of the machine; a first of said outer chambers defining an air-feeding opening communicating with said first end of said transparent cylinder; a second of said outer chambers including an exhaust cylinder connected to a second end of said transparent cylinder to discharge exhaust air outside the machine; one of said side frames forming an exhaust ammonia gas and vapor-discharge opening communicating with the interior of said first inner chamber; and a fan device including a fan case disposed in said second outer chamber so that exhaust ammonia gas and vapor is discharged outside a copying room through said opening.

* * * * *